A. NAECKEL.
PISTON ROD PACKING.
APPLICATION FILED APR. 7, 1913.
1,072,975.  Patented Sept. 9, 1913.
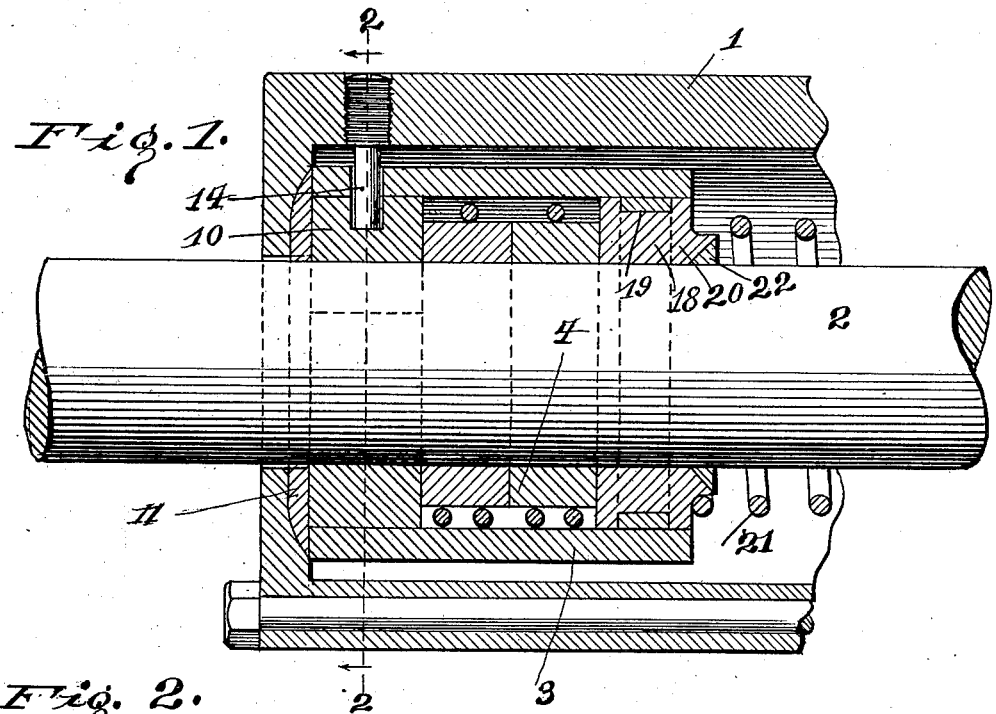
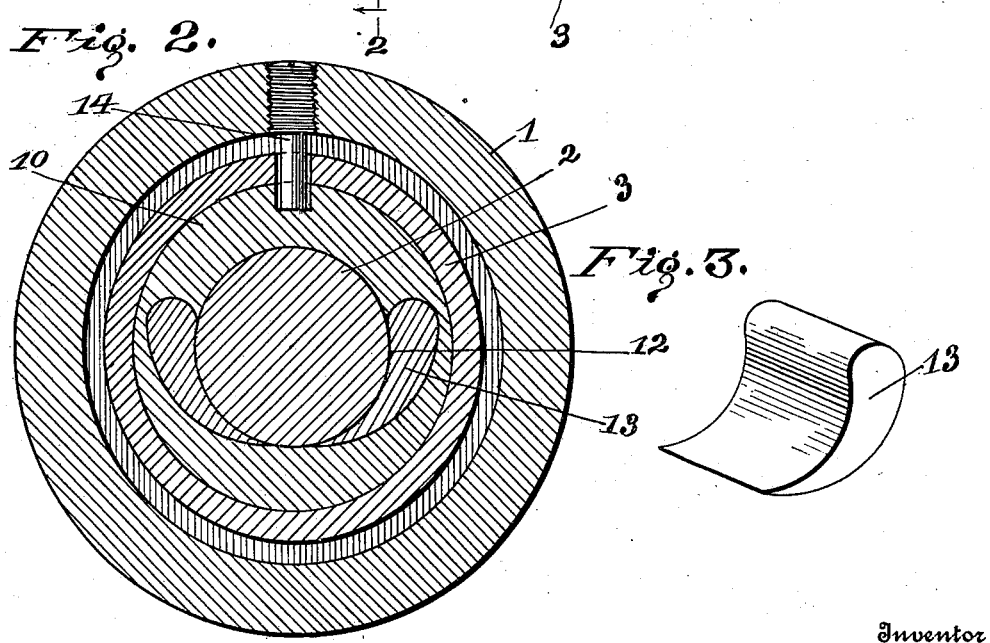
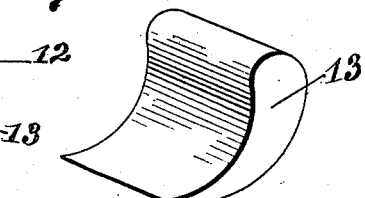
Witnesses  Inventor
 Alexander Naeckel.
 By
  Attorney

UNITED STATES PATENT OFFICE.

ALEXANDER NAECKEL, OF DAVENPORT, IOWA.

PISTON-ROD PACKING.

1,072,975.  Specification of Letters Patent.  Patented Sept. 9, 1913.

Application filed April 7, 1913. Serial No. 759,458.

*To all whom it may concern:*

Be it known that I, ALEXANDER NAECKEL, a resident of Davenport, in the county of Scott and State of Iowa, have invented certain new and useful Improvements in Piston-Rod Packing; and I do hereby declare the following to be a full, clear, and exact description of the invention, such as will enable others skilled in the art to which it appertains to make and use the same.

The object of this invention is to balance the packing against steam or other pressure, and prevent undue friction on the rod, and to compensate for all vibrations of the piston rod occasioned by wear or looseness of parts.

In the accompanying drawings, Figure 1 is a longitudinal sectional view, with parts broken away. Fig. 2 is a cross sectional view on line 2—2, Fig. 1. Fig. 3 shows one of the segments.

Referring to the drawing, 1 designates a gland forming an extension of a steam or other cylinder, and 2 the piston rod. Within the gland 1 is a cylindrical casing 3 which is designed to contain all the packing elements. The packing rings 4, which may be of any desired form, but preferably similar to those described in Patent No. 723,681, are located within the casing 3. The outer end of this casing is closed by a collar 10 which fits snugly within the casing, and which bears against a ring 11 which is free to vibrate on a concaved seat in the gland. Opposite portions of the wall of the opening in this collar are recessed, as at 12, to accommodate two vertically-disposed packing segments 13 which completely fill such recesses, completing the circle of the opening which accommodates the piston rod. The upper ends of the segments and the uppermost ends of the recesses form ball-and-socket connections between the segments and the collar. This construction permits the segments to gravitally accommodate themselves to the piston rod to always maintain a tight fit against the latter and to compensate for wear. The collar 10 is securely held in position to retain the segments vertically. The means shown for this purpose consists of a stud 14 projecting from the gland through the casing and into a recess in the collar. The other end of the casing is also closed against the entrance of steam or other pressure by a second collar 18, which is shown as being retained in place by a snap or piston ring 19 fitting in a circumferential groove. The outer face of the latter is formed with a boss 20 over which fits one end of a coil spring 21. The boss is internally tapered to receive a soft metal ring 22 which forms a temporary seal or packing.

The two end collars, 10 and 18, and the inclosing casing 3 prevent steam or other pressure from reaching the packing within the casing. The collar 18 presses firmly against the packing which in turn presses against collar 10, and the latter against the vibrating ring. The packing as a whole is free to move with any lateral deflection of the piston rod. The collars 10 and 18 may be made in sections, if desired.

The collar 10 with its segments insures a close working joint and the segments being free to move will accommodate themselves to all inequalities in the rod without interfering with the working thereof.

It will be seen that by my invention, I avoid all side strain on the piston rod, all pressure being in a line parallel to the rod.

I claim as my invention:

1. A packing comprising a casing freely movable under any deflection of a piston rod, packing elements inclosed in the casing, and means at the opposite ends of the latter for preventing steam or other pressure from reaching the packing.

2. A packing comprising a casing freely movable under any deflection of a piston rod, packing elements inclosed in the casing, collars designed to fit on a piston rod and closing the ends of the casing, and means for compensating for wear carried by one of the collars.

3. In combination with a gland and a piston rod, a casing freely-movable in reference to said gland and through which the piston rod is designed to extend, packing on the piston rod inclosed wholly within the casing, and collars for closing the ends of said casing.

4. In combination with a gland, a vibratable ring seated against said gland, and a piston rod, a casing bearing against said ring and freely movable with the piston rod in reference to said gland, packing on the piston rod inclosed wholly within the casing, and collars for closing the ends of said casing.

5. In a packing, a collar designed to fit on a piston rod and having its opening formed with oppositely-disposed recesses, and self-adjusting segments fitted in said recesses and pivoted at their upper ends.

6. In a packing, a collar designed to fit on a piston rod and having its opening formed with oppositely-disposed recesses rounded at their upper ends, and self-adjusting segments rounded at their upper ends to fit against the rounded ends of said recesses, said segments being thereby pivoted at their upper ends so as to accommodate themselves to the piston rod.

7. In a packing, a collar designed to fit on a piston rod, means for holding said collar as against turning, said collar having opposite vertically-disposed recesses, and self-adjusting segments fitted in said recesses and having a swinging movement from their upper ends.

8. A piston rod packing comprising packing rings, a casing for inclosing said rings, a retaining collar at one end of said casing, a holding spring for said collar forming a fluid-tight joint, a second collar at the other end of said casing, said last-mentioned collar having its opening formed with oppositely-disposed recesses, and self-adjusting segments fitted in said recesses.

In testimony whereof, I have signed this specification in the presence of two subscribing witnesses.

ALEXANDER NAECKEL.

Witnesses:
 WM. H. JUER,
 ALBERT JANSEN.

---

Copies of this patent may be obtained for five cents each, by addressing the "Commissioner of Patents, Washington, D. C."